Figure 1:
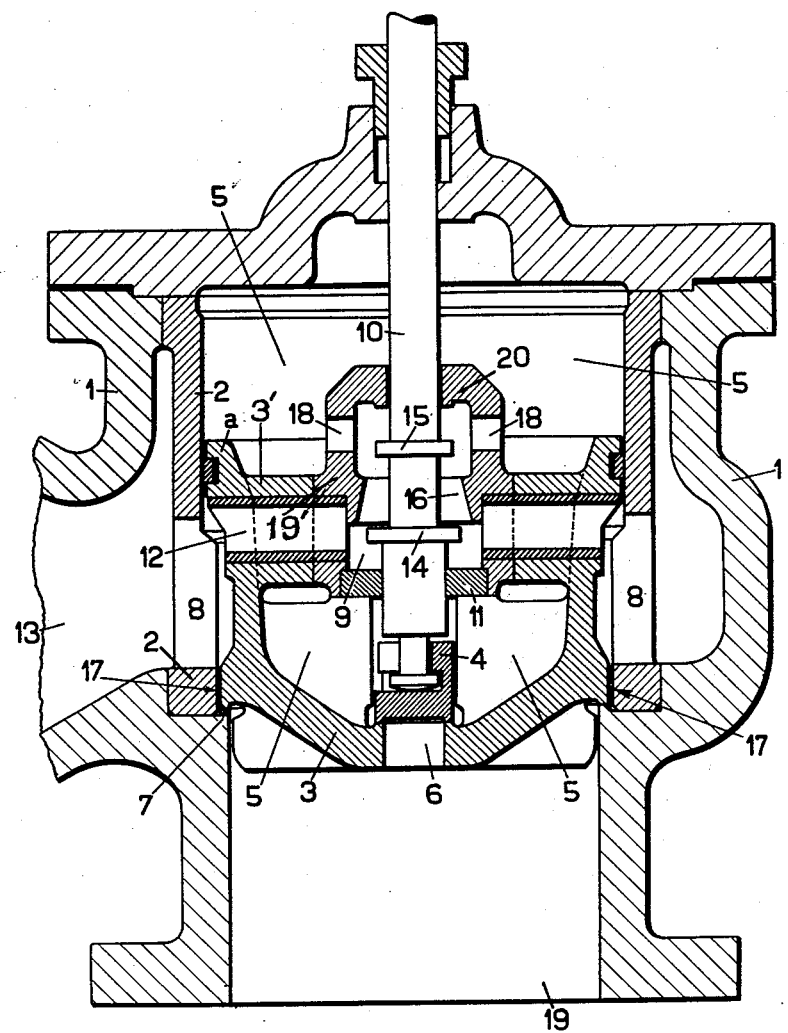

Patented Feb. 21, 1928.

1,659,846

UNITED STATES PATENT OFFICE.

FRITZ WAGNER, OF BERLIN-LICHTERFELDE, GERMANY.

VALVE COMPRISING AN EQUALIZING CHAMBER, A MAIN AND AN AUXILIARY VALVE.

Application filed June 17, 1926, Serial No. 116,643, and in Germany May 22, 1926.

My invention relates to valves comprising an equalizing chamber, a main and an auxiliary valve, in which the main and auxiliary valves are connected mechanically as well as by a fluid coupling, the latter being effected by throttling the passage between the equalizing chamber and the fluid inlet.

It is an object of my invention to absolutely prevent hammering of the main valve and to this end I combine a dog for the mechanical coupling which is operatively connected with the means for operating the auxiliary valve and cooperates with a check on the main valve, with a throttling device which constitutes the fluid coupling and is also operatively connected with said operating means, and I so arrange the dog and the throttling device that the distance between the dog and the check does not exceed the relative displacement of the throttling device or fluid coupling with regard to the main valve which is required for effecting the maximum throttling action between the inlet for the fluid under pressure and the equalizing chamber.

The dog by which the mechanical coupling is effected will generally be secured to, or made integral with, the spindle by which the auxiliary valve is operated.

Experience has shown that in valves of this type some specimens which are exactly similar to the others as to size and design hammer more or less intensely on their dogs on the valve spindles during a given percentage of the main valve opening period. Upon investigation, it was found that the resistance to opening of the main valve must be rather various even in valves of equal size and design for it was found that the stroke of the spindle required for opening the main valve was not equal in all valves and that those valves invariably hammered in which this stroke was a maximum.

In my invention these drawbacks are overcome by arranging the dog and the throttling device on the valve spindle as described.

In the drawings two types of valves embodying my invention are illustrated by way of example.

Figure 2:
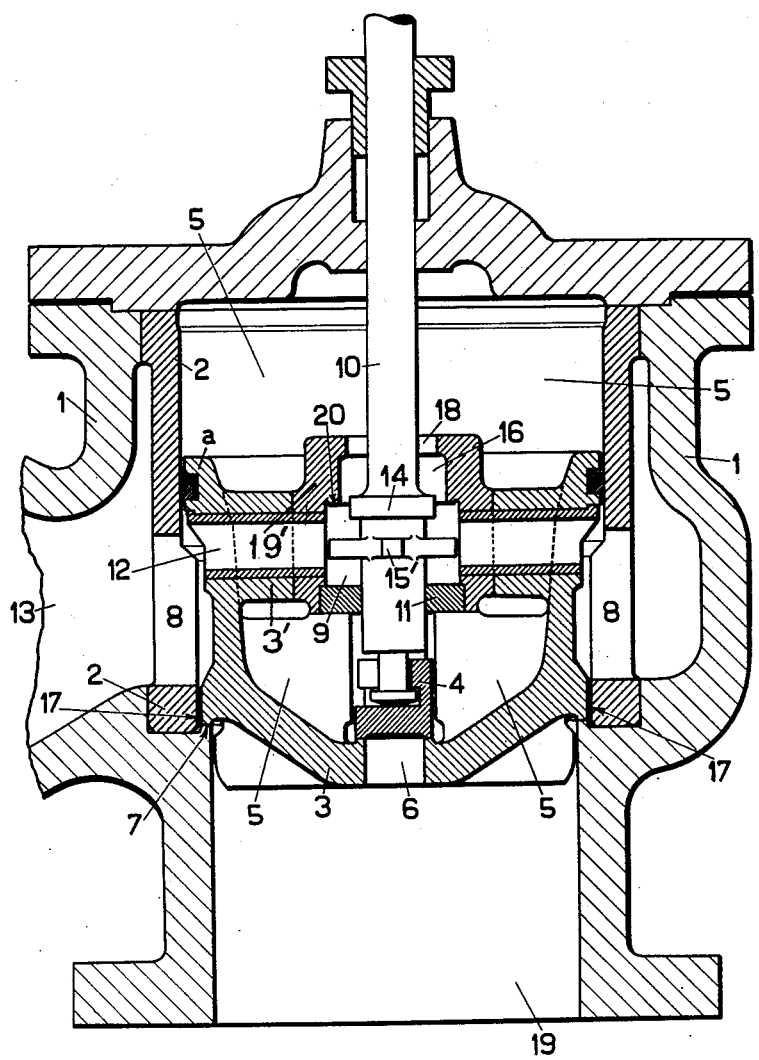

Fig. 1 is an axial section of a valve in which the dog or mechanical coupling is arranged above, and Fig. 2 is an axial section of a valve in which the dog is arranged below, the throttling device or fluid coupling.

The general arrangement is substantially the same in both figures and therefore identical parts have been designated with the same reference numerals. 1 is the valve casing, 2 is a liner, and $a$ is a piston formed at the upper end of the main valve 3 and fitting the liner 2. 7 is the seat of the main valve 3 in the casing 1. 4 is the auxiliary valve which is seated above a perforation 6 in the bottom of the main valve 3. The space above the piston $a$ and the cavity of the main valve 3 form the equalizing chamber 5 from which fluid under pressure is discharged into the delivery pipe 19 when the auxiliary valve 4 is opened. 10 is the spindle of the auxiliary valve 4 which projects from a stuffing box at the upper end of the casing 1.

Fluid under pressure, for instance, steam, is admitted into the casing 1 through a pipe 13 and into tubes 12 through ports 8 in the liner 2. The tubes 12 are inserted, in the manner of stays, in hollow arms 3' of the main valve 3 and in holes of a cage 19' which is inserted in the main valve and constitutes a steam chamber 9 within the main valve.

11 is a plate inserted in the cage 19' at its bottom closing the steam chamber 9 of the main valve 3 at the bottom and the spindle 10 of the auxiliary valve passes through this plate. 16 is a passage and 18 are ports connecting the top of the chamber 9 with the equalizing chamber 5. 14 is a throttling device on the spindle 10 which with the passage 16 constitutes the fluid coupling and regulates the supply of fluid under pressure to the chamber 5 in proportion to the relative displacement of the spindle 10 and the main valve 3. A dog 15 is secured on the spindle 10 above the disc 14 and adapted to cooperate with a check formed by the cover of the chamber 9 in the body of the main valve and indicated at 20.

The distance between the dog 15 and the check 20 with closed auxiliary valve is somewhat less than the distance from the upper face of the disc 14 to the upper edge of the passage 16.

When the auxiliary valve 4 is opened by its spindle 10 fluid under pressure flows to the delivery pipe 19 from the equalizing chamber 5 through the opening 6 below the auxiliary valve 4. At the same time, however, the disc 14 throttles increasingly the passage 16 so that with the increasing lift of the spindle the pressure in the equalizing chamber is rapidly reduced. This causes a reduction in the total load on the main valve—which load is equal to the proper weight of the valve plus the fluid pressure on its upper face—and finally the load is smaller than the "buoyancy" of the main valve due to the fluid pressure on the lower face of the main valve piston $a$. The main valve is then opened by this excess of buoyancy and is moved upwards at the same velocity as the spindle 10. If the main valve does not open under the action of its buoyancy, because its resistance to opening is too high, it will be assisted by the dog 15 being placed against the check 20 by hand. This increase in buoyancy does not interfere with the steady opening of the main valve because at the moment when the dog engages its check 20 the upper face of the throttling device has not yet reached the upper edge of the passage 16.

Consequently, the supply of fluid under pressure to the equalizing chamber 5 is invariably increased to the amount required for equalizing the velocities of the main valve and the spindle at the moment when the main valve starting from its closing position begins to move more rapidly than the spindle.

It follows that with the arrangement of the dog and the check as described hammering of the main valve is absolutely prevented in contradistinction to prior devices. In these the distance between the dog and its check at the main valve was invariably greater than the distance between the throttling device and the plane of the upper edge of the passage 16. If, in any valve, the main valve opened only after the dog had engaged the check, the upper face of the throttling device had moved beyond the upper edge of the passage at the moment when these parts engaged. The throttling device the diameter of which was quite slightly smaller than the inner diameter at the upper end of the passage, had cut off the supply of fluid under pressure to the equalizing chamber when it reached the upper edge of the passage and had thereby accelerated still more the reduction of pressure in the equalizing chamber. In consequence, the main valve which was positively opened by the dog moved upwards immediately upon opening at such a rate that it had acquired a certain momentum when the upper edge of the passage 16 coincided with the upper face of the throttling device 14. Under the action of this momentum, the main valve was shot upwards beyond this edge so that a large annular space was laid open between the throttling device and the wall of the passage 16, allowing a corresponding quantity of fluid to enter the chamber 5 and to increase the total load on the main valve so much beyond its buoyancy that it was forced downwards at great energy until its check 20 struck the dog 15 and completely cut off the supply of fluid under pressure to the equalizing chamber. Therefore the main valve hammered on its dog until the decreasing pressure difference between the fluid inlet 13 and the discharge pipe 19 gradually damped the hammering.

In the device described with reference to Fig. 1, the relative motion of the main and auxiliary valves required for causing them to become mechanically connected, viz, the distance between the dog 15 and its check 20 at the main valve, is less than the distance between the throttling disc 14 and the upper edge of the passage 16. Even if the two distances were equal the main valve would not hammer because any excess of velocity in the main valve with respect to the spindle 10 would be immediately made up for by the supply of fluid to the equalizing chamber which would start at the same time. However, as wear between the mating faces of 15 and 20 must be considered, the first-named distance is preferably made smaller than the second-named one.

Referring now to Fig. 2, this is operated exactly as the valve described the only difference being the construction of the passage 16 which is cylindrical and instead of the lateral ports 18, Fig. 1, has an opening 18' at the top, and the parts 14 and 15' are reversed.

Means are provided for preventing undesirable upward acceleration of the main valve 3 by the fluid flowing between the valve and its seat 7 when the valve lifts. Such acceleration which might cause hammering of the main valve on its seat, is eliminated by throttling the fluid before it gets to the seat 7. To this end the ports 8 in the liner 2 are made V-shaped or otherwise reduced in area at the bottom, and the clearance 17 between the body of the main valve and the liner 2 is made rather narrow. In this manner the fluid is throttled in front of the seat 7 so that its pressure is unable to throw the main valve 3 brusquely upwards.

I claim:

A valve comprising a casing, means for supplying fluid under pressure to said casing, an equalizing chamber, a main valve and an auxiliary valve in said casing, means for operating said auxiliary valve, a dog and a throttling device both operatively connected with said means, and a check on said main valve adapted to cooperate with said dog, the distance between said dog and said check not exceeding the relative displacement of said throttling device and said main valve which is required for the maximum throttling action on the connection between said fluid supplying means and said equalizing chamber.

In testimony whereof I affix my signature.

FRITZ WAGNER.